Oct. 23, 1956  H. S. GALYEAN  2,767,770
MOTOR VEHICLE BED CONSTRUCTION
Filed May 10, 1955  3 Sheets-Sheet 1
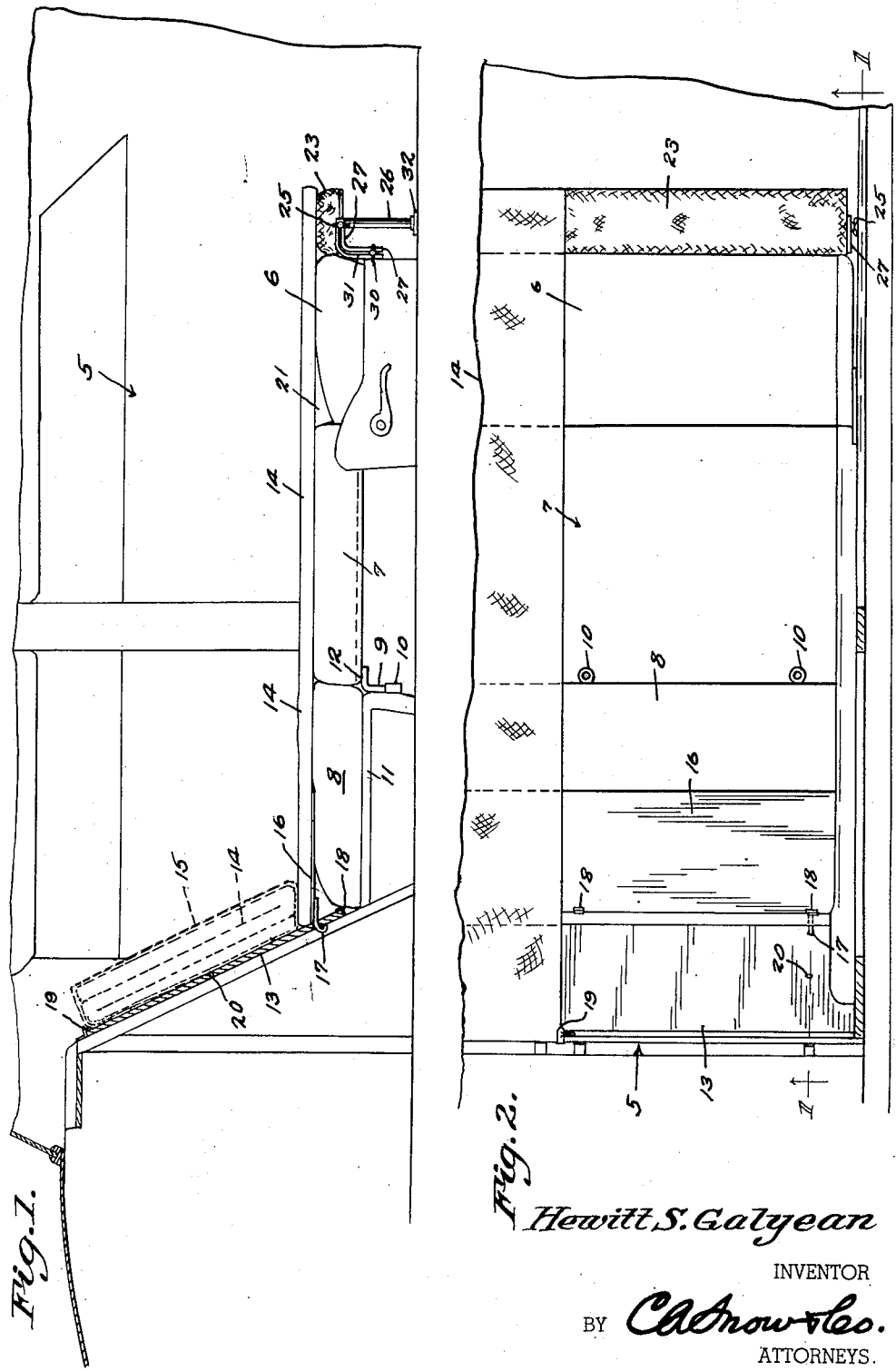
Hewitt S. Galyean
INVENTOR
BY C.A. Snow & Co.
ATTORNEYS.

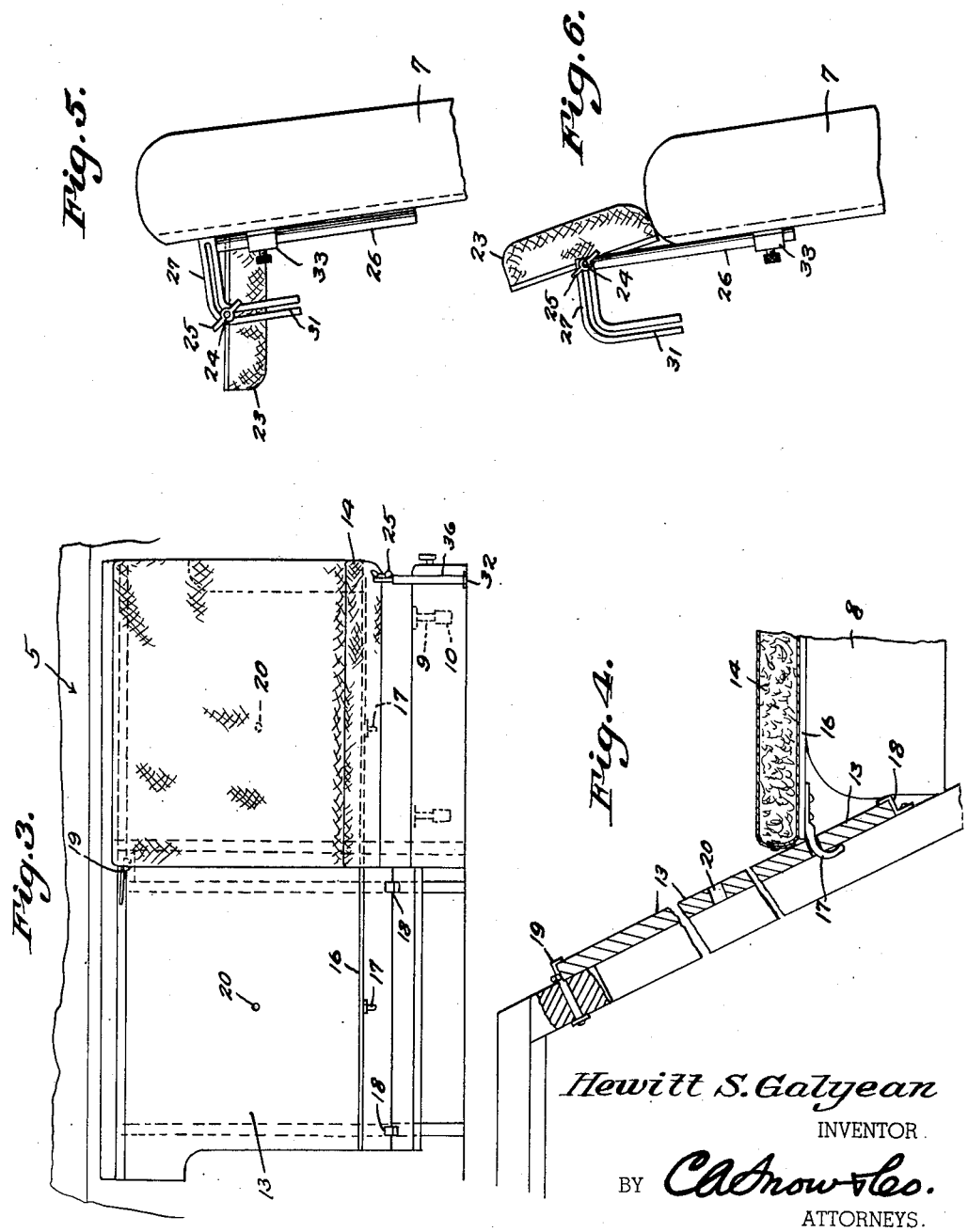

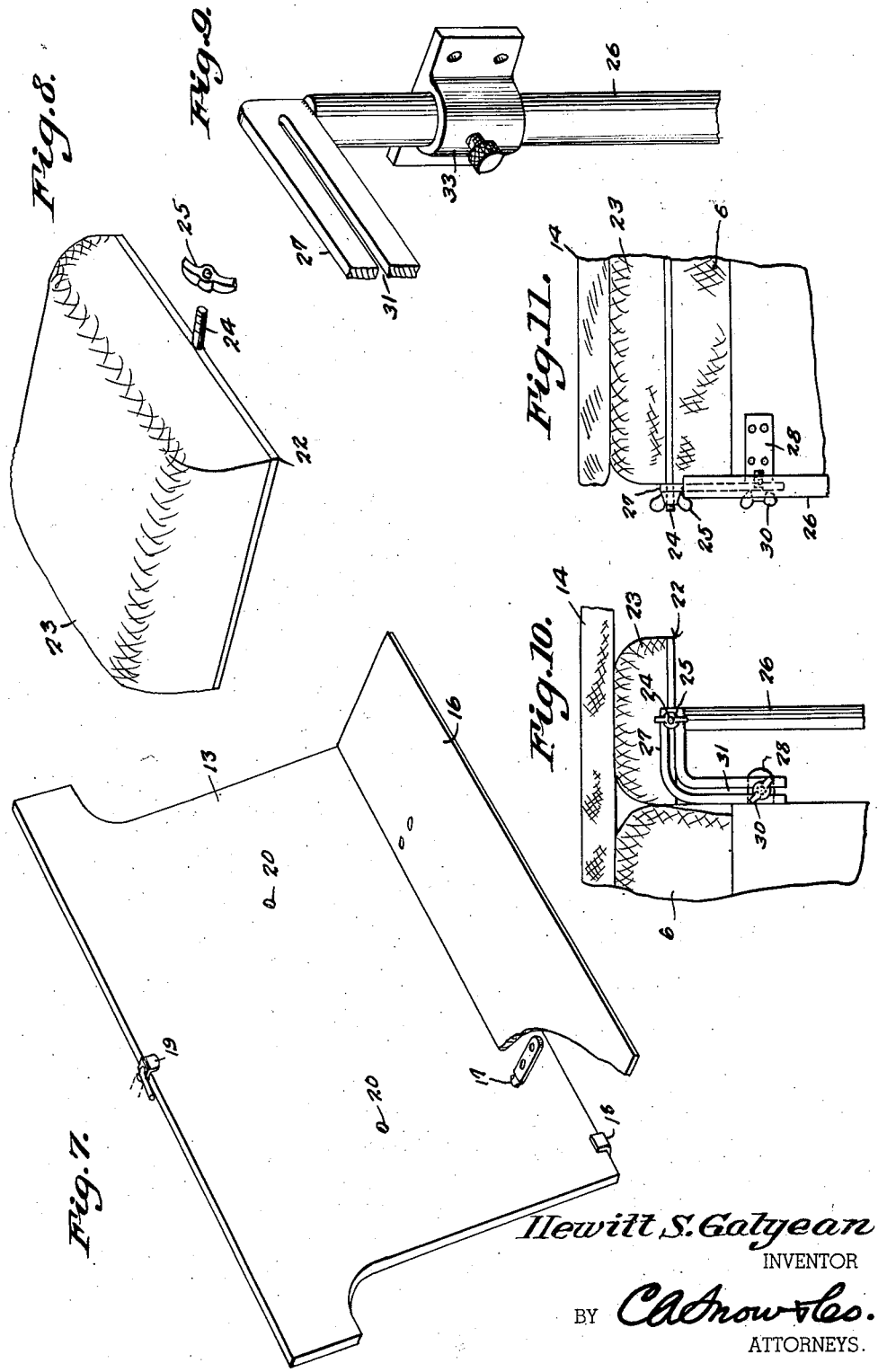

United States Patent Office 2,767,770
Patented Oct. 23, 1956

2,767,770

MOTOR VEHICLE BED CONSTRUCTION

Hewitt S. Galyean, Lackey, Va.

Application May 10, 1955, Serial No. 507,255

3 Claims. (Cl. 155—6)

This invention relates to motor vehicle body construction and more particularly to the interior construction of the body.

The primary object of the invention is to provide a one-piece mattress so constructed of foam rubber, that it may be folded upon itself to provide a back cushion for the rear seat of the vehicle, which when unfolded or extended may be positioned over the seat and back cushions of a motor vehicle providing a comfortable bed of standard size.

Another object of the invention is to provide means for securing the mattress on the cushions of the seat of the motor vehicle on which the mattress is being used, the mattress being of the divided type.

Still another object of the invention is to provide means for spanning the spaces between adjacent edges of the cushions of the vehicle when the cushions have been extended in the formation of a bed, to insure comfort to the person using the bed.

A further object of the invention is to provide a supporting board at the rear of the back seat of a vehicle against which the mattress in its folded condition rests, to provide a comfortable back under normal conditions for the back seat of the vehicle.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a fragmental elevational view of the interior of a vehicle body showing the cushions of the seats moved to support a mattress in the formation of a bed, taken on line 1—1 of Fig. 2.

Fig. 2 is a plan view thereof.

Fig. 3 is a front elevational view illustrating a form of mattress as folded in the formation of a cushion at the back of a rear seat of a vehicle.

Fig. 4 is a sectional view through the back cushion supporting board, mounted on the vehicle body frame.

Fig. 5 is a view illustrating the extension foot rest as secured to the back of the front seat of a vehicle providing a table or support.

Fig. 6 is a fragmentary elevational view of the foot rest when located on the back of the front seat of the vehicle providing a head rest.

Fig. 7 is a perspective view of the rear cushion supporting board and movable mattress support.

Fig. 8 is a perspective view of the folded section of the foot rest.

Fig. 9 is a perspective view of the supporting rod for the foot rest.

Fig. 10 is a fragmental and elevational view, showing the foot rest as in a supporting position.

Fig. 11 is a fragmental front elevational view showing the foot rest in its mattress supporting position.

Referring to the drawings in detail, the interior of a motor vehicle body is indicated generally by the reference character 5 and is equipped with conventional divided front seat cushions 6, pivoted backs 7 and rear seat cushions 8. Since the seat and back sections and mattress sections are identical, only one seat, back and mattress section will be described in detail.

Under normal conditions, the pivoted back 7 is moved to an upright position providing the back cushion for the front seat cushion 6. However, when it is desired to convert the cushion into a bed, it is only necessary to swing the back 7 downwardly to a horizontal position, as shown by Fig. 1 of the drawings. Supporting arms 9 are removably held within the sockets 10, secured to the forward edge of the rear seat 11, the supporting arms having right-angled ends 12 on which the pivoted back 7 rests, as better shown by Fig. 1 of the drawings.

The reference character 13 indicates a supporting board, which is of a construction to fit within the space directly at the rear of the seat 11, the supporting board providing a support for the mattress 14 which is constructed of foam rubber and formed into a layer to be extended across the upper surfaces of the cushions 6, 7 and 8, in the formation of a bed. It will be understood that the mattress is of a thickness so that it may be readily folded upon itself, as shown in dotted lines in Fig. 1 of the drawings, and encased in a flexible casing 15, it being contemplated to provide an opening in the flexible casing 15 to permit the folded mattress to be positioned therein, the opening being closed by the conventional type of interlocking fastener, not shown in the present drawings.

In view of the construction of the rear seat cushion 8, a wide support 16 is provided in the form of a board constructed preferably of plywood or similar light material, the wide board 16 being positioned between the cushion 8 and mattress 14, spanning the space between the rear edge of the rear seat cushion 8 and lower edge of the supporting board 13.

Spaced hooks 17 extend rearwardly from the wide support 16 and pass into openings formed in the supporting board 13 to hold the wide support 17 in its supporting position. The supporting board 13 has its lower edge resting in the brackets 18, while a clamp 19 carried by the body frame is designed to clamp over the upper edge of the supporting board 13 removably securing the supporting board within the space from which the conventional rear seat back rest has been removed. As shown by Fig. 7 of the drawings, the hooks 17 are positioned in openings disposed adjacent to the lower edge of the supporting board 13. However, it is to be understood that the hooks 17 may be positioned in openings 20 formed intermediate the upper and lower edges of the board, should it be desired to incline the wide support 16 for the comfort of the person using the bed.

A cushion indicated by the reference character 21 is shaped to fit within the space between the rear curved edge of the front seat cushion 6 and mattress 14 to insure a level support for the mattress 14.

In order that the mattress will be extended to the desired length as in a standard bed, a foot rest 22 is provided, the foot rest comprising a padded section 23 through which a rod 24 extends, the ends of the rod 24 extending beyond the ends of the padded section 23 where they are threaded to receive the wing nuts 25. Supporting rods 26 having right-angled ends 27 are adjustably held in brackets 28, that in turn are secured at the front of the front seat of the vehicle. Wing nuts 30 are extended through threaded openings of brackets 28 and pass through the slots 31 that are formed in the right-angled ends 27 of the supporting rods 26. Pedestals 32 are provided and have sockets in the upper surfaces thereof in which the supporting rods 26 rest. Thus, it will be seen that due to this construction, the foot rest may be readily dismantled and stored in the trunk compartment of a vehicle, and readily reassembled for positioning under one end of the mattress 14, as shown by Fig. 1.

Should it be desired to convert the foot rest into a table the supporting rods 26 are withdrawn from the sockets of the pedestals 32 and the supporting rods positioned in brackets 33 secured to the rear surface of the front seat of the vehicle.

The padded section 23 may now be reversed, as shown by Fig. 5 of the drawings and the wing nuts 30 tightened to hold the padded section in a position to receive articles, such as plates, cups or the like from which food may be consumed. By swinging the padded section upwardly to the position shown by Fig. 6 of the drawings and then elevating the rods 26, the foot rest may be converted into a head rest for the comfort of the person using the front seat of the vehicle.

From the foregoing it will be seen that due to the construction shown and described, I have provided an attachment whereby the seats and backs of the seats may be moved to positions to provide a horizontal mattress support, and the cushion of the back seat may be unfolded providing a soft and comfortable mattress to be positioned over the horizontal support provided by moving the seats and backs of the seats to their horizontal positions.

Having thus described the invention, what is claimed is:

1. The combination with the frame and back seat cushions of a vehicle, adapted to be extended in parallel relation with respect to each other on such frame, providing a horizontal support, of a removable mattress unit comprising an inclined supporting board secured to the frame at one end of said horizontal support, said supporting board having openings formed therein, a foldable mattress section including a wide support adapted to be extended over said horizontal support, spaced hooks extending from one end of said wide support adapted to fit into said openings securing said mattress against movement longitudinally of said horizontal support in one direction, and said mattress section when folded providing a cushion for the back seat of said vehicle.

2. The combination with the frame, front and back seat cushions of a vehicle, adapted to be extended in parallel relation with respect to each other on said frame with their adjacent edges engaging, providing a horizontal support, of a removable mattress unit comprising a substantially vertical supporting board disposed at the rear end of said mattress unit, brackets extending from said frame on which the supporting board is removably held, said board having a pair of openings adjacent to the lower edge thereof, a mattress section adapted to be extended over said cushions, a wide support resting on one of said cushions, hooks extending from one edge of said wide support adapted to hook into said openings of said supporting board holding said wide support in a horizontal position providing a support for one end of said mattress section.

3. A mattress device for positioning on the frame and cushions and back rests of a vehicle arranged horizontally, comprising a substantially vertical supporting board secured at one end of said frame against which one end of a seat cushion rests, a wide horizontal support resting on a cushion overlying the contacting edges of said substantially vertical supporting board and cushion adjacent thereto, and on which one end of a mattress positioned over the horizontal seat and back cushion of the vertical rests, means for removably securing the wide horizontal support to said vertical supporting board, and a removable foot rest at one end of said mattress on which one end of said mattress rests.

References Cited in the file of this patent

UNITED STATES PATENTS

| | | |
|---|---|---|
| 92,418 | Barbarin | July 13, 1869 |
| 1,083,797 | Brown | Jan. 6, 1914 |

FOREIGN PATENTS

| | | |
|---|---|---|
| 418,372 | Great Britain | Oct. 22, 1934 |